(12) United States Patent
Campbell et al.

(10) Patent No.: US 11,539,273 B2
(45) Date of Patent: Dec. 27, 2022

(54) COMPOSITES AND METHODS OF MAKING COMPOSITE MATERIALS

(71) Applicant: Hamilton Sundstrand Corporation, Charlotte, NC (US)

(72) Inventors: Kris H. Campbell, Poplar Grove, IL (US); Shin Katsumata, Rockford, IL (US); Brian C. Konopa, Rockford, IL (US); Erika M. Danckers, Rockford, IL (US); Andreas C. Koenig, Rockford, IL (US); Ashutosh Joshi, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/142,189

(22) Filed: Jan. 5, 2021

(65) Prior Publication Data
US 2022/0216773 A1 Jul. 7, 2022

(51) Int. Cl.
*H02K 3/48* (2006.01)
*H02K 15/00* (2006.01)
*H02K 3/487* (2006.01)
*H02K 3/52* (2006.01)

(52) U.S. Cl.
CPC ......... *H02K 15/0018* (2013.01); *H02K 3/487* (2013.01); *H02K 3/527* (2013.01)

(58) Field of Classification Search
CPC ........ H02K 1/27; H02K 1/2773; H02K 1/276; H02K 1/274; H02K 2213/03; H02K 15/0018; H02K 9/223; H02K 3/487; H02K 3/24; H02K 3/527; H02K 9/227; H02K 2205/12

USPC ....................... 310/156.01–156.84
See application file for complete search history.

(56) References Cited

U.S. PATENT DOCUMENTS

| | | | |
|---|---|---|---|
| 5,811,908 A * | 9/1998 | Iwata | F02B 63/04 310/156.08 |
| 6,124,659 A | 9/2000 | Rowe et al. | |
| 7,821,171 B2 | 10/2010 | Lemmers, Jr. et al. | |
| 10,720,809 B2 | 7/2020 | Patel et al. | |
| 2004/0263019 A1 | 12/2004 | Buchan et al. | |
| 2005/0231058 A1 * | 10/2005 | Down | H02K 3/527 310/192 |
| 2015/0028709 A1 * | 1/2015 | Ueda | H02K 1/2706 310/156.19 |
| 2018/0278112 A1 * | 9/2018 | Patel | H02K 3/20 |

FOREIGN PATENT DOCUMENTS

GB  1169445 A  11/1969
WO  WO-2019180308 A1  9/2019

OTHER PUBLICATIONS

Extended European Search Report for European Patent Application No. EP22150321.2, dated May 30, 2022.

* cited by examiner

*Primary Examiner* — Leda T Pham
(74) *Attorney, Agent, or Firm* — Locke Lord LLP; Daniel J. Fiorello; Gabrielle Gelozin

(57) ABSTRACT

A wedge for use in an electric machine includes a central portion comprising at least a first material, a first wing integrally attached to the central portion, and a second wing integrally attached to the central portion opposite the first wing, wherein the first wing, and the second wing include a second material.

16 Claims, 3 Drawing Sheets

COMPOSITES AND METHODS OF MAKING COMPOSITE MATERIALS

BACKGROUND

Technological Field

The present disclosure relates generally a wedge to be positioned between coils in an electrical generator, and more specifically to a wedge including a plurality of materials.

Description of Related Art

Electrical generators typically include a shaft that is driven for rotation, and which carries a plurality of field coils. The coils are typically separated by wedges. Wedges on electromagnetic machines are typically electrically conductive and thus have associated losses due to eddy currents. Wedges can be used smooth the area between laminations, thereby reducing friction and windage losses, however historically this has increased eddy current losses. Thus one loss cannot be reduced without increasing the other. Historically wedges have been generally been considered satisfactory for their intended purpose. However, there is still a need in the art for improved wedges having improved thermal conductivity while minimizing other losses. The present disclosure provides a solution for this need.

SUMMARY OF THE INVENTION

A rotor for a generator includes a shaft, a rotor core radially outward from the shaft and having a plurality of poles spanning axially along the rotor core, a plurality of windings wrapped axially around each of the plurality of poles, a plurality of wedges, each wedge being positioned between two adjacent poles of the plurality of poles, each wedge having a central portion comprising at least a first material, a first wing integrally attached to the central portion, and a second wing integrally attached to the central portion opposite the first wing, wherein the first wing, and the second wing include a second material.

Each of the windings can contact the second material of each of the wedges and not contact the first material of each of the wedges. The central portion can include the second material. The first material can be electrically non-conductive. The second material can be electrically conductive. The first material can include titanium. The second material can include aluminum. The central portion is primarily composed of the second material.

The central portion can include a quadrilateral section radially outward from a triangular central leg separating the first wing from the second wing. The quadrilateral section can include the first material and the second material. The quadrilateral section can include three outward facing edges, wherein each of the edges includes the second material, and two of the edges do not include the first material. The quadrilateral section can includes a first "L" shaped portion including the second material. The quadrilateral section includes a second "L" shaped portion can include the second material bracketing a portion of the first material with the first "L" shaped portion. It is also considered that the first wing and the second wing include the first material, a portion of an outer edge of the first wing, and a portion of an outer edge of the second wing include the first material. The central portion can include an aperture configured to allow coolant oil flow. The central portion can include a fastener located radially inward of the aperture. The fastener can include steel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
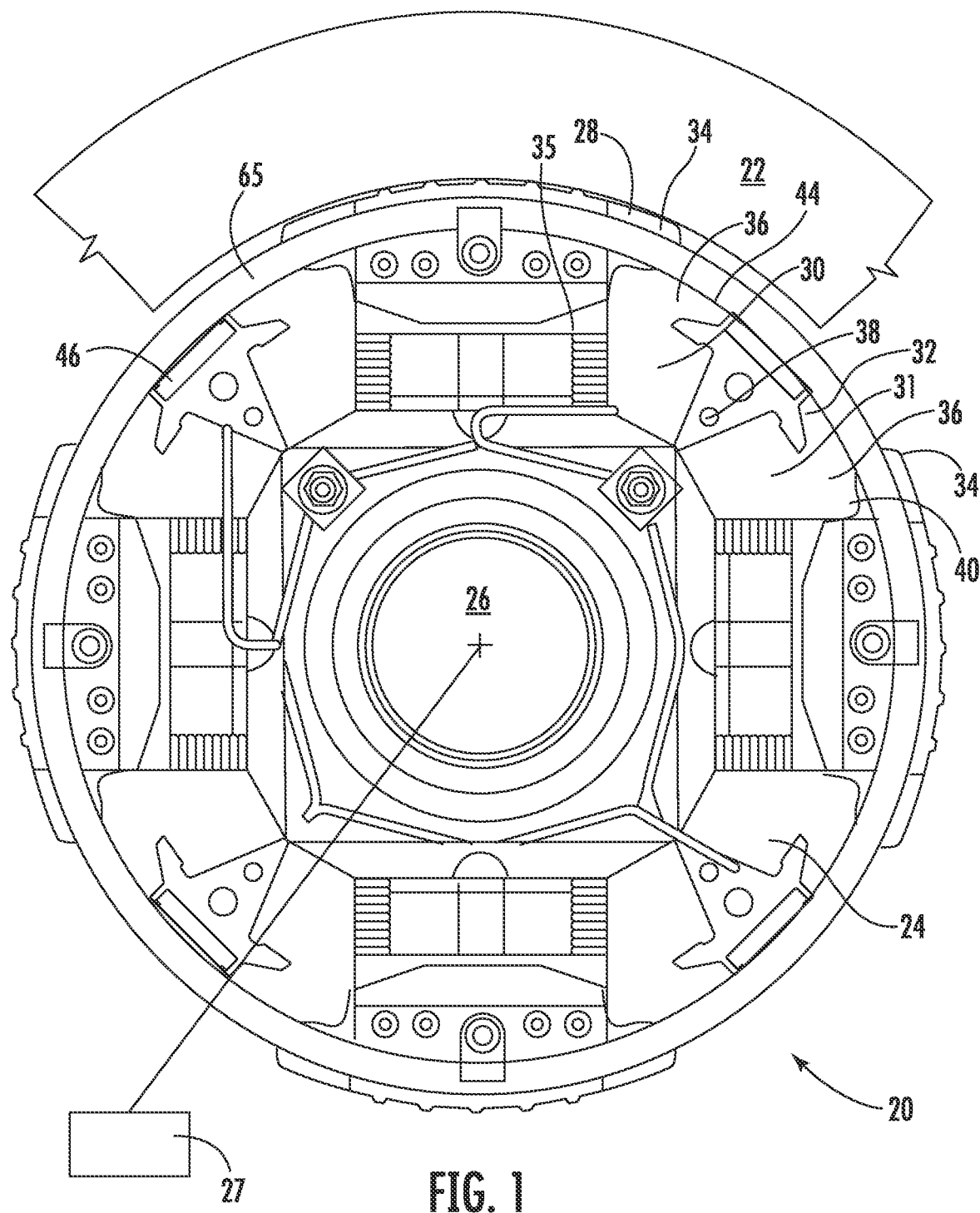
FIG. 1 is a schematic sectional view of a machine.

Reference will now be made to the drawings wherein like reference numerals identify similar structural features or aspects of the subject disclosure. For purposes of explanation and illustration, and not limitation, a partial view of an exemplary embodiment of a rotor accordance with the disclosure is shown in FIG. 1 and is designated generally by reference character 100. Other embodiments of the rotor and wedges used therein in accordance with the disclosure, or aspects thereof, are provided in FIGS. 2 and 3, as will be described. The disclosure describes a wedge that is both smooth on the outer diameter to reduce friction and windage, and yet limits high conductivity, both electrical and thermal, to regions where heat needs to be transferred.

FIG. 1 shows a cross-section of a machine 20 having a central shaft 26, which is driven to rotate by a source of rotation, such as a gas turbine engine 27 (shown schematically) and adjacent to a stator 22 (shown schematically) to generate electricity. The rotor 24 includes a lamination stack 28 having poles 35 with circumferentially extending wedges 32. The wedges 32 sit in a channel radially inwardly of circumferentially opposed pole tips 34 on poles 35. The channels receive field coils or windings 30 and 31, which are wound around the poles 35. The wedge 32 separates and supports adjacent coils 30 and 31.

Figure 2:
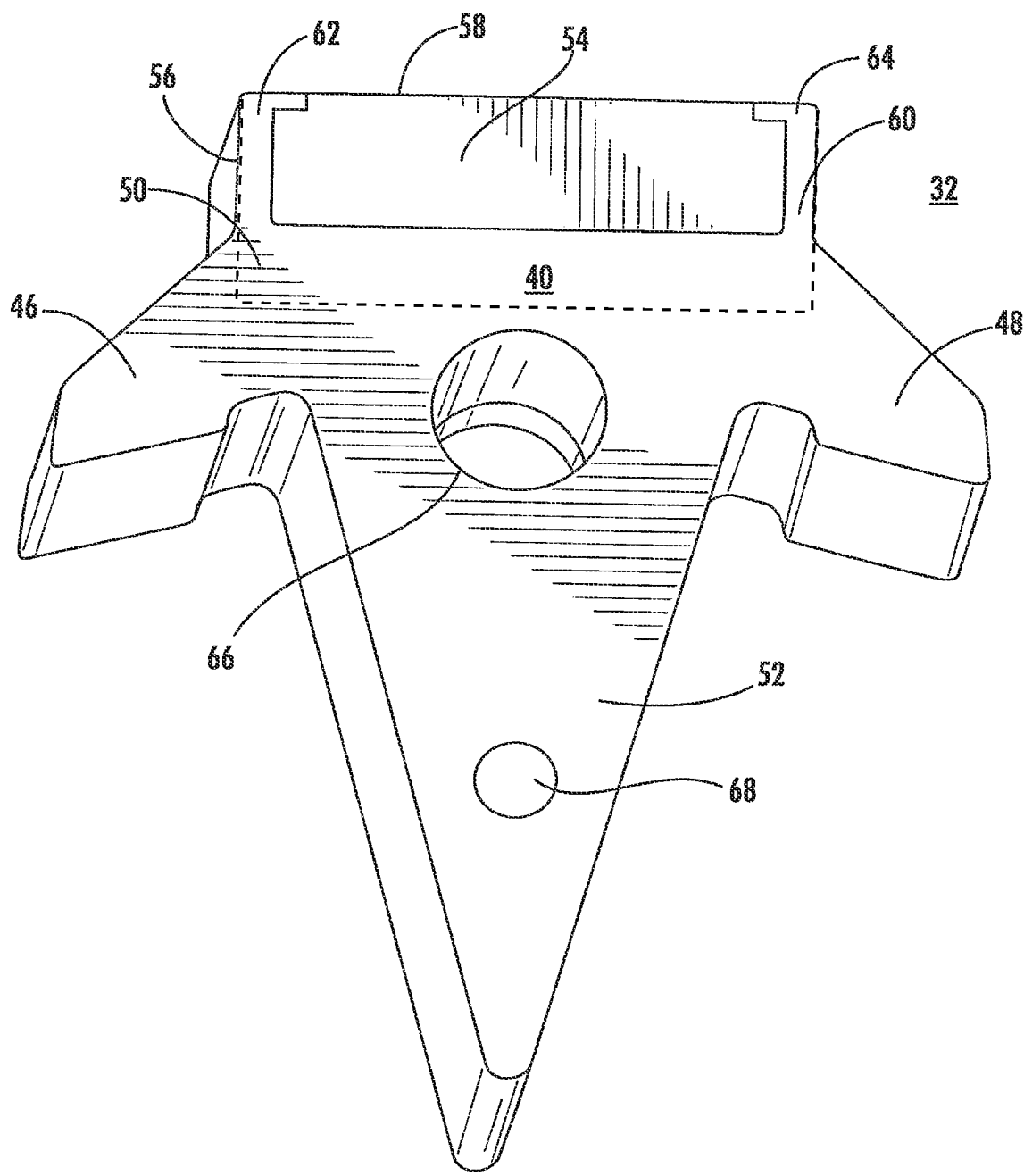
FIG. 2 is a perspective view of a wedge for the machine of FIG. 2.

FIG. 2 shows a detailed view of a wedge 32 of FIG. 1. The wedge 32 includes a central portion 40. The central portion 40 includes a first material and a second material. A first wing 46 is integrally attached to the central portion 40, and a second wing 48 is integrally attached to the central portion 40 opposite the first wing 46. The first wing 46 and the second wing 48 include the second material only. Each of the windings, seen in FIG. 1, contact the wings 46, 48 of each of the wedges and do not contact the first material section of each of the wedges.

Figure 3:
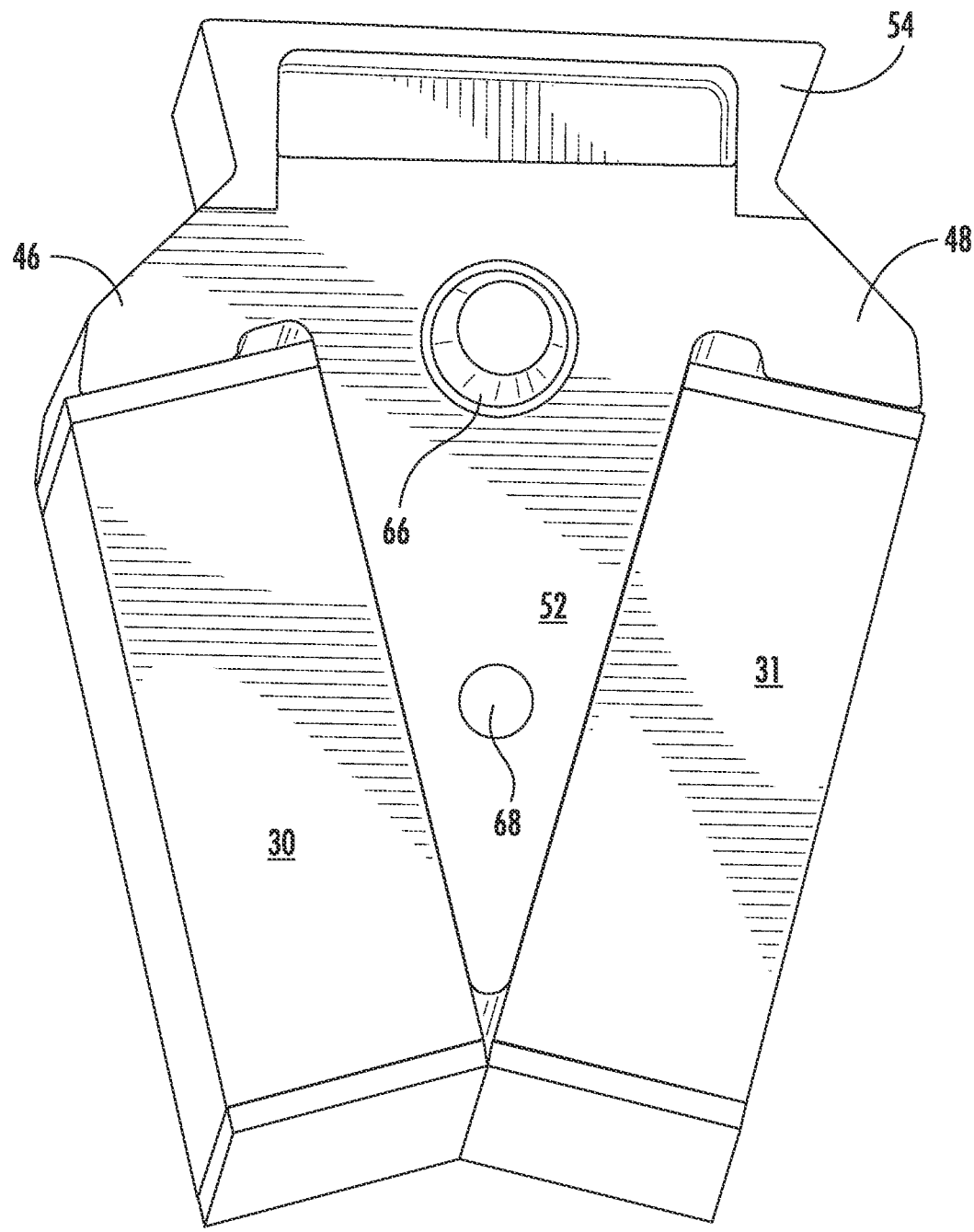
FIG. 3 is a perspective view of an embodiment of a wedge for the machine of FIG. 1.

The first material can be electrically non-conductive, such as titanium. The second material can be electrically conductive, such as aluminum. The central portion 40 is primarily composed of the second material, with only a small portion touching the outer surface, with the outer surface having an air gap placed after it. The central portion 40 includes a quadrilateral section 50 positioned radially outward from a triangular central leg 52 which separates the first wing 46 from the second wing 48. The quadrilateral section 50 includes the small section 54 of the first material. The quadrilateral section 50 can include three outward facing edges 56, 58, 60, where each of the edges are partially made up of the second material, and two of the edges 56 and 60 do not include the first material. The quadrilateral section 50 includes a first "L" shaped portion 62 made of the second material and a second "L" shaped portion 64 bracketing the first material section 54. The central portion 40 also includes an oil flow aperture 68 and a fastener aperture 66 located radially inward of the aperture. The fastener can include steel, and more specifically cobalt steel. FIG. 3 shows an embodiment of the wedge 32 wherein the first material section 54 hugs the second material section such that each of the wings 46 and 48 include the first material.

The methods and systems of the present disclosure, as described above and shown in the drawings, provide for wedges with better conductivity properties. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A wedge for use in an electric machine comprising:
   a central portion comprising at least a first material;
   a first wing integrally attached to the central portion; and
   a second wing integrally attached to the central portion opposite the first wing, wherein the first wing, and the second wing include a second material;
   wherein the central portion includes a quadrilateral section radially outward from a triangular central leg separating the first wing from the second wing, wherein the quadrilateral section includes the first material and the second material, wherein the quadrilateral section includes a first face, a second face opposite the first face, a third face radially outward facing and opposite the triangular central leg, a first "L" shaped portion of the second material, and a second "L" shaped portion of the second material opposite the first "L" shaped portion, wherein the first "L" shaped portion and the second "L" shaped portion bracket the first material at the first and second faces of the quadrilateral portion and extend onto the third face.

2. The wedge of claim 1, wherein the central portion includes the second material.

3. The wedge of claim 1, wherein the first material is not electrically conductive.

4. The wedge of claim 1, wherein the second material is electrically conductive.

5. The wedge of claim 1, wherein the first material includes titanium.

6. The wedge of claim 1, wherein the second material includes aluminum.

7. The wedge of claim 1, wherein the central portion is primarily composed of the second material.

8. The wedge of claim 1, wherein the central portion includes an aperture configured to allow coolant oil flow.

9. The wedge of claim 8, wherein the central portion includes a fastener or fastener aperture located radially inward of the aperture.

10. The wedge of claim 9, wherein the fastener includes steel.

11. The wedge of claim 1, wherein the first wing and the second wing include the first material.

12. The wedge of claim 11, wherein a portion of an outer edge of the first wing, and a portion of an outer edge of the second wing include the first material.

13. The wedge of claim 1, wherein the first material of the quadrilateral portion includes a radially outboard ledge and wherein the first and second "L" shaped portions of the second material are configured to seat on a radially outward surface of the radially outboard ledge to retain the first material between and/or within the first and second "L" shaped portions".

14. A rotor for a generator comprising:
    a shaft;
    a rotor core radially outward from the shaft and having a plurality of poles spanning axially along the rotor core;
    a plurality of windings wrapped axially around each of the plurality of poles; and
    a plurality of wedges, each wedge being positioned between two adjacent poles of the plurality of poles, each wedge having a central portion comprising at least a first material;
    a first wing integrally attached to the central portion; and
    a second wing integrally attached to the central portion opposite the first wing, wherein the first wing, and the second wing include a second material,
    wherein the central portion includes a quadrilateral section radially outward from a triangular central leg separating the first wing from the second wing, wherein the quadrilateral section includes the first material and the second material, wherein the quadrilateral section includes a first face, a second face opposite the first face, a third face radially outward facing and opposite the triangular central leg, a first "L" shaped portion of the second material, and a second "L" shaped portion of the second material opposite the first "L" shaped portion, wherein the first "L" shaped portion and the second "L" shaped portion bracket the first material at the first and second faces of the quadrilateral portion and extend onto the third face.

15. The rotor of claim 14 wherein each of the windings contacts the second material of each of the wedges.

16. The rotor of claim 14, wherein each of the windings does not contact the first material of each of the wedges.

* * * * *